(12) United States Patent
Ushiroda

(10) Patent No.: US 8,568,612 B2
(45) Date of Patent: Oct. 29, 2013

(54) NEGATIVE ELECTRODE MATERIAL AND METHOD OF MANUFACTURE THEREOF

(75) Inventor: Shin Ushiroda, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 244 days.

(21) Appl. No.: 13/157,898

(22) Filed: Jun. 10, 2011

(65) Prior Publication Data
US 2011/0309292 A1    Dec. 22, 2011

(30) Foreign Application Priority Data
Jun. 18, 2010 (JP) .................................. 2010-139313

(51) Int. Cl.
*H01M 4/88* (2006.01)

(52) U.S. Cl.
USPC ...................... 252/182.1; 429/209; 429/218.1

(58) Field of Classification Search
USPC .............................. 252/182.1; 429/218.1, 209
See application file for complete search history.

(56) References Cited

FOREIGN PATENT DOCUMENTS

| JP | A-10-12269 | 1/1998 |
| JP | A-10-106542 | 4/1998 |
| JP | A-10-134814 | 5/1998 |
| JP | A-2004-296370 | 10/2004 |

*Primary Examiner* — Khanh Tuan Nguyen
(74) *Attorney, Agent, or Firm* — Oliff & Berridge, PLC

(57) ABSTRACT

A silicate negative electrode material comprising a smectite wherein, when the smectite is measured with a powder x-ray diffractometer, a peak is found in a case where $2\theta$ is in a range from 7.45° to 9.18°.

3 Claims, 4 Drawing Sheets

US 8,568,612 B2

NEGATIVE ELECTRODE MATERIAL AND METHOD OF MANUFACTURE THEREOF

INCORPORATION BY REFERENCE

The disclosure of Japanese Patent Application No. 2010-139313 filed on Jun. 18, 2010, including the specification, drawings and abstract, is incorporated herein by reference in its entirety.

BACKGROUND OF THE INVENTION

1. Field of the Invention

The invention relates to a novel negative electrode material and a method of manufacturing the same. More particularly, the invention relates to a high-capacity silicate negative electrode material and a method of manufacturing the same.

2. Description of the Related Art

In recent years, lithium secondary batteries have become increasingly commonplace as batteries having a high voltage and a high energy density. Owing to the expanded use of lithium secondary batteries in a broad range of fields and to demands for high performance, a variety of research is being carried out to further increase the performance of such batteries. For example, various materials are being investigated for use in negative electrodes, with carbon materials, aluminum alloys and the like seeing commercial application as negative electrode materials in practical batteries. However, although carbon materials are widely used because they are able to impart a high capacity, such materials have a low specific gravity and thus occupy a large proportion of the volume at the interior of the battery. Also, conventionally the performance of carbon materials has already been improved to a level where further improvements would be difficult to achieve. For this reason, achieving a higher capacity with negative electrode materials other than carbon materials is indispensable for increasing battery performance. At the same time, there exists a desire for the materials which make up a battery to be materials which are abundantly available on Earth.

Investigations on negative electrode materials other than carbon materials are being carried out to address this demand. For example, Japanese Patent Application Publication No. H10-12269 (JP-A 10-12269) discloses a solid electrolyte that has been imparted with, lithium ion conductivity, which electrolyte is composed of montmorillonite as the primary ingredient and contains therein a water-soluble lithium salt. Japanese Patent Application Publication No. H10-134814 (JP-A 10-134814) describes a lithium secondary battery which uses a carbon material obtained by inserting a carbon material precursor between the layers of a clay mineral having a layered crystal structure, such as montmorillonite, firing at from about 1,500° C. to about 2,000° C. in a vacuum or a nonreactive gas atmosphere so as to form a carbon material between the layers of the clay mineral, then dissolving and removing the clay mineral with an inorganic acid such as hydrofluoric acid.

In addition, Japanese Patent Application Publication No. 2004-296370 (JP-A 2004-296370) teaches a method of producing a negative electrode material for lithium secondary batteries, which method involves preparing a slurry of a layered mineral clay such as montmorillonite and a lithium salt so as to insert lithium ions between the layers of the layered clay mineral substance, then separating the layered clay mineral into which lithium ions have been inserted from the slurry to obtain a negative electrode material. As an illustrative example, this published patent application indicates that a lithium ion-containing montmorillonite which is crushed and heat-treated at 300° C. has a good discharge capacity. The powder x-ray diffraction pattern for this material is shown together with the powder x-ray diffraction pattern for the montmorillonite prior to heat treatment. However, even when the negative electrode materials shown as specific examples in JP-A 2004-296370 contained lithium ion-containing montmorillonite, the charge capacity was at most about 350 mAh/g.

SUMMARY OF THE INVENTION

It has thus been difficult in the above related art to obtain a negative electrode material having a high capacity by using a material other than carbon materials which is abundantly available on Earth. Accordingly, the invention provides a negative electrode material which has a high capacity and is obtained by using a material other than carbon materials which is abundantly available on Earth. the invention also provides a method of manufacturing such a negative electrode material.

A first aspect of the invention relates to a silicate negative electrode material comprising a smectite. In the negative electrode material, when the smectite is measured with a Powder x-ray diffractometer, a peak is found in a case where 2θ is in a range from 7.45° to 9.18°. This arrangement enables a negative electrode material which has a high capacity and uses a material other than carbon materials that is abundantly available on Earth to be obtained.

A second aspect of the invention relates to a method of manufacturing a negative electrode material, which method includes the step of the method comprising: firing montmorillonite as a material to obtain a powder. In this method, the obtained powder contains a silicate of a smectite and, when the smectite is measured with a powder x-ray diffractometer, a peak is found in a case where 2θ is in a range from 7.45° to 9.18°.

This invention makes it possible to obtain a negative electrode material which has a high capacity and is obtained using a material other than carbon materials which is abundantly available on Earth.

BRIEF DESCRIPTION OF THE DRAWINGS

The features, advantages, and technical and industrial significance of the invention are described in the following detailed description of example embodiments with reference to the accompanying drawings, in which like numerals denote like elements, and wherein.

DETAILED DESCRIPTION OF EMBODIMENTS

Figure 1:
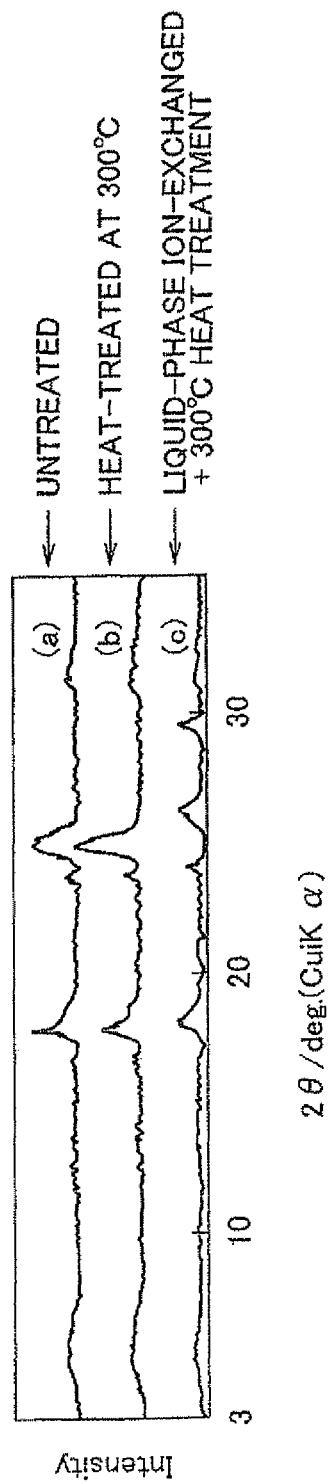
FIG. 1 is a photograph of powder x-ray diffraction intensity plots for the various types of montmorillonite shown in FIG. 6 of JP-A 10-12269.
Figure 2:
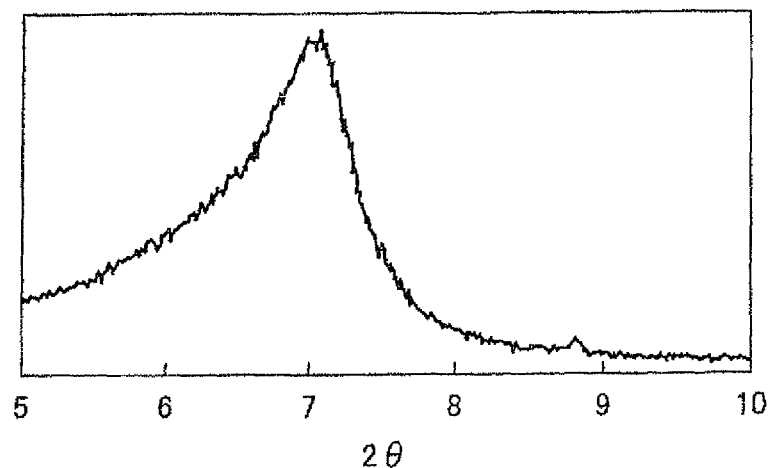
FIG. 2 is a partially enlarged view of a powder x-ray diffraction intensity plot for smectite silicate for a negative electrode material outside the scope of this invention.
Figure 3:
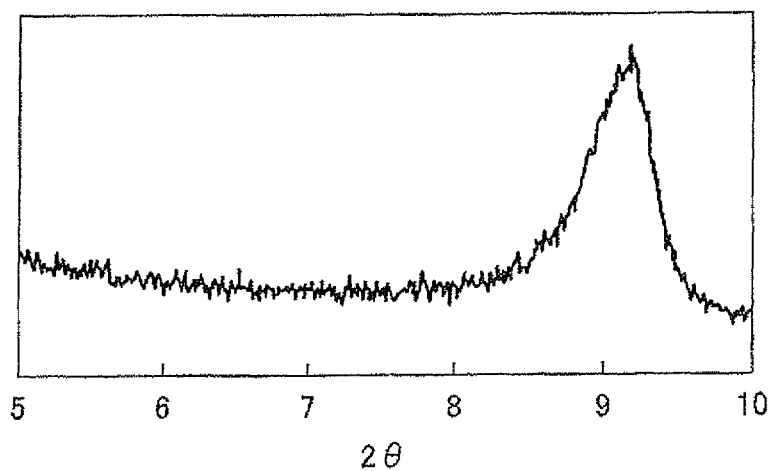
FIG. 3 is a partially enlarged view of a powder x-ray diffraction intensity plot for smectite silicate for a negative electrode material in an embodiment of the invention.

Embodiments of the invention are described below in conjunction with FIGS. 1 to 6. The following description of embodiments of the invention is premised on the measurement of smectite-containing montmorillonite as the specimen with a powder XRD. In the diffractometer, a beam of x-rays impinges upon a specimen in such a way as to be reflected by the specimen. In the following description, "$2\theta$" refers to the angle of reflection to the horizontal by the reflected beam, and the beam of x-rays which impinges upon the specimen so as to be reflected thereby impinges on the specimen at, with respect to the horizontal, an angle which is one-half the angle of reflection. Moreover, as described below, "peak" refers to a peak in intensity of the reflected beam. As shown in FIGS. 1 and 2, montmorillonites for conventional negative electrode materials, when measured with a XRD, have a peak in the vicinity of $2\theta=6$ to $7°$. By contrast, as shown in FIG. 3, the smectite in this invention is a silicate which, when measured with a XRD, has a peak in a range of $2\theta=7.45$ to $9.18°$.

Figure 4:
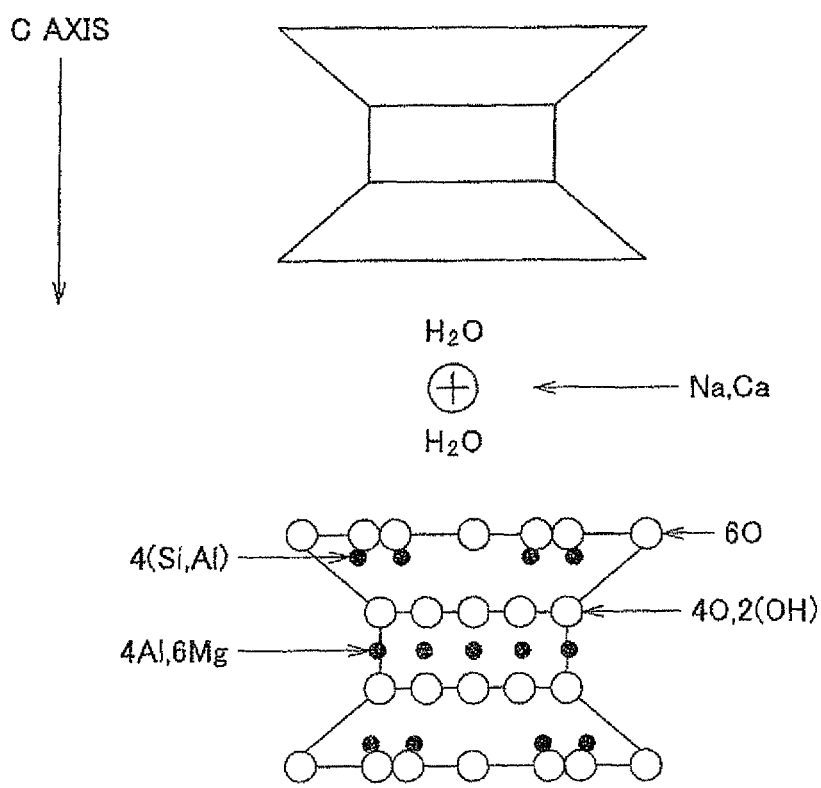
FIG. 4 is a schematic, sectional view of the structure, prior to firing, of montmorillonite used in an embodiment of the method of the invention.
Figure 5:
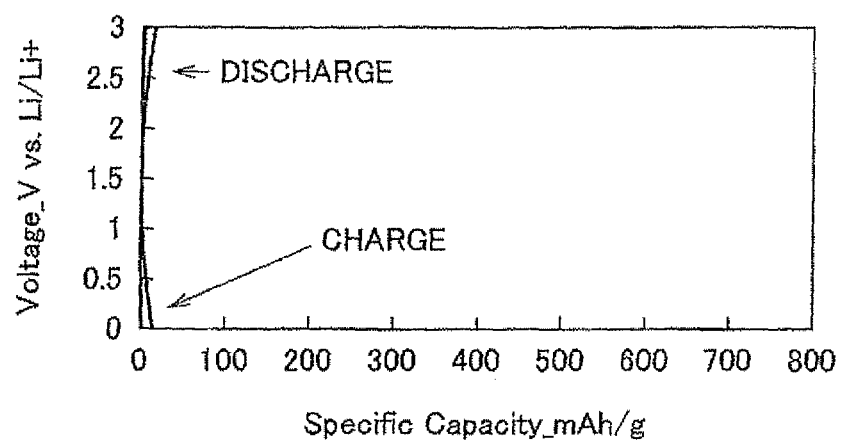
FIG. 5 is a capacity versus battery voltage curve during charging and discharging in an evaluation, against a lithium counter electrode, of the negative electrode obtained using a negative electrode material outside the scope of the invention.
Figure 6:
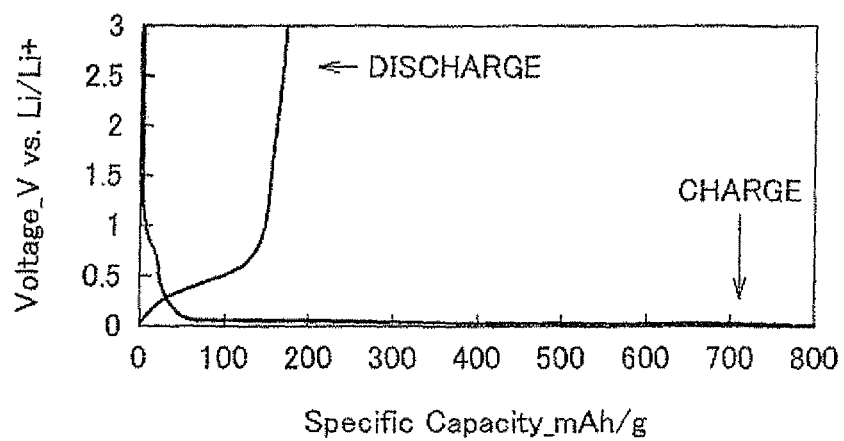
FIG. 6 is a capacity versus battery voltage curve during charging and discharging in an evaluation, against a lithium counter electrode, of a negative electrode according to an embodiment of the invention.

The montmorillonite as a material used in this invention is, as shown in FIG. 4, a layered clay substance which has a chemical constitution of, for example, $(Na, Ca)_{0.33}(Al,Mg)_2 Si_4O_{10}(OH)_2 \cdot nH_2O$ (where Na may be substituted with K, and Al may be substituted with Fe(III)), and is available throughout the world, including in Japan. As is apparent from comparing FIGS. 4 and 5, in evaluations against a lithium counter electrode, the negative electrode material of the invention has a larger capacity during charging and discharging than does a negative electrode obtained using a conventional montmorillonite-containing negative electrode material. The charge/discharge capacity obtained with a negative electrode material containing a lithium salt heat treatment product is especially large.

In the negative electrode material of the invention, the smectite is a silicate which, when measured with a XRD, has a peak in a range of $2\theta=7.45°$ to $9.18°$, preferably in a range of $2\theta=7.95°$ to $9.18°$, and includes in particular a fired lithium salt. The amount of the fired lithium salt per mole of the smectite silicate is preferably from 0.001 to 5 moles, more preferably from 0.01 to 2.5 moles, and even more preferably from 0.01 to 1 mole. At an amount of lithium below the lower limit, the advantageous effects of the invention may be small. At an amount above than the upper limit, the advantageous effects may diminish and, in an evaluation against a lithium counter electrode, the charge/discharge capacity of the resulting negative electrode may instead have a tendency to decline.

With regard to the smectite silicate-containing negative electrode material in the embodiments of the invention, although the reasons why the charge/discharge capacity is large in evaluations of the negative electrode against a lithium counter electrode have not been theoretically elucidated, this appears to have something to do with the degree to which the water of crystallization present between the layers of the montmorillonite, which is a layered substance, has been removed. For example, the degree to which water of crystallization is removed appears to have increased due to firing at 600° C. In the method of the invention, by adding lithium salt followed by firing, the water in the interlayer space can be removed, and lithium ions can be inserted between these layers or in other layers.

The negative electrode material of this embodiment can be obtained by using a smectite silicate which, for a powder obtained by firing the montmorillonite or the like at a temperature greater than, for example, 300° C., and preferably from 500° C. to 800° C., in any atmosphere, such as in air, has a peak, as measured with a XRD, in a range of $2\theta=7.45°$ to $9.18°$, and preferably in a range of $2\theta=7.95°$ to $9.18°$. As shown in FIGS. 1 to 3, the montmorillonite, when ordinarily measured with a powder XRD, has a peak near $2\theta=6°$ to $7°$ which matches the size of the unit lattice, and thus includes water of crystallization.

In the above method, a lithium salt may be advantageously added to the montmorillonite. The addition and mixture of lithium salt to the montmorillonite is carried out in a liquid phase or a solid phase, although it may be preferably carried out in a solid phase. The amount of lithium salt added per mole of montmorillonite is preferably from 0.001 to 5 moles, more preferably from 0.01 to 2.5 moles, and even more preferably from 0.01 to 1 mole.

Illustrative examples of the lithium salt include lithium carbonate ($Li_2CO_3$), lithium nitrate ($LiNO_3$), lithium phosphate ($Li_3PO_4$), lithium sulfate ($Li_2SO_4$), lithium sulfite ($Li_2SO_3$), lithium borate ($Li_3BO_3$), lithium metaborate ($LiBO_2$), lithium tetraborate ($Li_2B_4O_7$), lithium metaphosphate ($LiPO_3$), lithium iodate ($LiO_3$), lithium acetate ($CH_3COOLi$), lithium benzoate ($C_6H_5COOLi$), lithium lactate ($CH_3CH(OH)COOLi$), lithium oxalate ($Li_2C_2O_4$), lithium tetraphenylborate ($LiB(C_6H_5)_4$), lithium stearate ($C_{17}H_{35}COOLi$), lithium chloride (LiCl), lithium fluoride (LiF), lithium perchlorate ($LiClO_4$), lithium hexafluorophosphate ($LiPF_6$), lithium tetrafluoroborate ($LiBF_4$), lithium orthosilicate ($Li_4SiO_4$) or lithium metasilicate. ($Li_2SiO_3$).

An exemplary method for obtaining a negative electrode using the above negative electrode material of the invention involves forming a layer of the negative electrode material on a substrate, such as copper foil, by vapor deposition, sputtering or chemical vapor deposition (CVD). Another exemplary method for obtaining a negative electrode using the negative electrode material of the invention is a coating method wherein a paste containing the above negative electrode material is coated onto a substrate, then dried to form a negative electrode material layer on the substrate. The negative electrode material layer in the above coating methods may be composed of the above-described negative electrode material and also, for example, a conductive agent such as a carbon material and a binder such as carboxymethylcellulose (CMC) or styrene-butadiene rubber (SBR).

Examples of the invention are shown below. The following examples are provided solely for the purpose of illustration, and are not intended to limit the invention. In the examples given below, XRD analysis of the montmorillonite was carried out with the following apparatus. An XRD manufactured by Rigaku Corporation was used. The montmorillonite employed was procured from Alfa Aesar (having a peak, as measured by XRD analysis, at $2\theta=7.05°$).

Example 1

Lithium nitrate was mixed with montmorillonite in a molar ratio of montmorillonite:$LiNO_3=1:0.4$, and the powder mixture was fired in air at 600° C. for 2 hours. XRD analysis was carried out on the resulting fired montmorillonite, and the peak position in a range of $2\theta=6$ to $10°$ was determined and indicated as $2\theta$. The results obtained are shown in Table 1 together with the other results.

[Electrode Production]

Using 3 g of the resulting montmorillonite, an aqueous slurry was prepared by adding to water and mixing the following ingredients so as to give a ratio of montmorillonite:conductive material (carbon material):CMC:SBR 88:10:1:1 (weight ratio). The slurry was coated onto copper foil, having a thickness of 10 μm (Nippon Foil Mfg. Co., Ltd.) and dried. This was pressed to an electrode density of 0.9 g/cm$^3$, then punched out as ϕ 16 mm diameter disks, thereby giving negative electrodes.

[Battery Fabrication]

Type 2032 coin cells were fabricated using the manufactured electrode as the negative electrode and a lithium counter electrode as the positive electrode, using an ethylene carbonate (EC): diethyl carbonate (DEC)=3:7 (volumetric ratio) mixed solvent containing 1 M of LiPF$_6$ as the electrolyte, and using a polyethylene separator.

[Evaluation of Electrochemical Characteristics]

The resulting coin cells were used to carry out operation in which lithium was inserted (charging) up to 0.01 V at 0.1 C (1 C being the current at which total charge can be achieved in one hour), after which lithium was extracted (discharging) at 3 V. The charge (or discharge) capacity per unit weight of active material was determined by the following formula Cell charge (discharge) capacity÷weight of active material. The results thus obtained are shown in Table 1 together with other results.

Example 2

Aside from changing the ratio of montmorillonite to lithium nitrate to montmorillonite:LiNO$_3$=1:0.01 (molar ratio), fired montmorillonite was obtained in the same way as in Example 1. The results obtained by carrying out XRD analysis are shown in Table 1 together with the other results. Aside from using this fired montmorillonite, electrode production and battery fabrication were carried out in the same way as in Example 1, following which the electrochemical characteristics were evaluated. The results obtained are shown in Table I together with other results.

Example 3

Aside from changing the ratio of montmorillonite to lithium nitrate to montmorillonite:LiNO$_3$=1:0 (molar ratio), fired montmorillonite was obtained in the same way as in Example 1. The results obtained by carrying out XRD analysis are shown in Table 1 together with the other results. Aside from using this fired montmorillonite, electrode production and battery fabrication were carried out in the same way as in Example 1, following which the electrochemical characteristics were evaluated. The results obtained are shown in Table 1 together with other results.

Example 4

Aside from changing the ratio of montmorillonite to lithium nitrate to montmorillonite:LiNO$_3$=1:1 (molar ratio), fired montmorillonite was obtained in the same way as in Example 1. The results obtained by carrying out XRD analysis are shown in Table 1 together with the other results. Aside from using this fired montmorillonite, electrode production and battery fabrication were carried out in the same way as in Example 1, following which the electrochemical characteristics were evaluated. The results obtained are shown in Table 1 together with other results.

Example 5

Aside from changing the ratio of montmorillonite to lithium nitrate to montmorillonite LiNO$_3$=1:5 (molar ratio), fired montmorillonite was obtained in the same way as in Example 1. The results obtained by carrying out XRD analysis are shown in Table 1 together with the other results. Aside from using this fired montmorillonite, electrode production and battery fabrication were carried out in the same way as in Example 1, following which the electrochemical characteristics were, evaluated. The results obtained are shown in Table 1 together with other results.

Comparative Example 1

Lithium nitrate was not added and raw, unfired montmorillonite was used instead of fired montmorillonite. The results obtained by carrying out XRD analysis are shown in Table 1 together with the other results. Aside from using this montmorillonite, electrode production and battery fabrication were carried out in the same way as in Example 1, following which the electrochemical characteristics were evaluated. The results obtained are shown in Table 1 together with the other results.

Comparative Example 2

Aside from changing the ratio of montmorillonite and lithium chloride to montmorillonite:LiCl=1:13 (molar ratio); and aside from refluxing for about 72 hours, then washing with ultrapure water and drying at 300° C. for 2 hours instead of firing at 600° C., reamed montmorillonite was obtained in the same way as in Example 1. The results obtained by carrying out XRD analysis are shown in Table 1 together with the other results. Aside from using this refluxed montmorillonite, electrode production and battery fabrication were carried out in the same way as in Example 1, following which the electrochemical characteristics were evaluated. The results obtained are shown in Table 1 together with the other results.

TABLE 1

| | Starting material | Treatment conditions | Firing | XRD 2θ (°) | Charge capacity per unit weight of active material (mAh/g) | Discharge capacity per unit weight of active material (mAh/g) |
| --- | --- | --- | --- | --- | --- | --- |
| Example 1 | Montmorillonite:LiNO$_3$ = 1:0.4 (molar ratio) | Solid phase | yes | 9.18 | 747.1 | 168.4 |

TABLE 1-continued

|  | Starting material | Treatment conditions | Firing | XRD 2θ (°) | Charge capacity per unit weight of active material (mAh/g) | Discharge capacity per unit weight of active material (mAh/g) |
|---|---|---|---|---|---|---|
| Example 2 | Montmorillonite:LiNO₃ = 1:0.01 (molar ratio) | Solid phase | yes | 9.17 | 763.7 | 118.0 |
| Example 3 | Montmorillonite:LiNO₃ = 1:0 (molar ratio) | Solid phase | yes | 9.18 | 261.5 | 25.4 |
| Example 4 | Montmorillonite:LiNO₃ = 1:1 (molar ratio) | Solid phase | yes | 7.95 | 550.4 | 115.6 |
| Example 5 | Montmorillonite:LiNO₃ = 1:5 (molar ratio) | Solid phase | yes | 7.45 | 319.4 | 50.8 |
| Comparative Example 1 | Montmorillonite:LiNO₃ = 1:0 (molar ratio) |  | no | 7.05 | 65.1 | 18.2 |
| Comparative Example 2 | Montmorillonite:LiCl = 1:13 (molar ratio) | liquid phase | yes | 7.36 | 56.6 | 14.7 |

The results in Table 1 show that, in a negative electrode material containing lithium-free smectite that was fired at 600° C., the smectite, when measured with XRD, had a peak at 2θ=7.45°; in an evaluation of the negative electrode versus a lithium counter electrode, the charge capacity was 319.4 mAh/g and the discharge capacity was 50.8 mAh/g. By contrast, in negative electrode materials containing montmorillonite or refluxed montmorillonite, the montmorillonite, when measured with a XRD, had a peak at 2θ=7.05° or 7.36°; in evaluations of the negative electrode versus a lithium counter electrode, the charge capacity was 65.1 mAh/g or 56.6 mAh/g, and the discharge capacity was 18.2 mAh/g or 14.7 mAh/g. These results indicate that negative electrode materials according to the invention have good charge/discharge characteristics. Moreover, the results in Table 1 show that, in negative electrode materials containing Lithium-containing smectite that were fired at 600° C., the smectite, when measured with a XRD, had a peak in a range of 2θ=7.95 to 9.18°; in evaluations of the negative electrode versus a lithium counter electrode, the charge capacity was from 550.4 to 763.7 mAh/g, and the discharge capacity was from 115.6 to 158.4 mAh/g, thus indicating a very large charge/discharge capacity.

The above-described embodiments of the invention are summarized below.

One of the embodiments relates to a silicate negative electrode material comprising a smectite. In the negative electrode material, when the smectite is measured with a powder x-ray diffractometer, a peak is found in a case where 2θ is in a range from 7.45° to 9.18°. This arrangement enables a negative electrode material which has a high capacity and uses a material other than carbon materials that is abundantly available on Earth to be obtained.

In this negative electrode material, the peak may be found in a case where 2θ is in a range from 7.95° to 9.18°.

This negative electrode material may further include a lithium salt heat treatment product.

In this negative electrode material, 2θ may refer to, when a beam of x-rays is caused to impinge on the smectite so as to be reflected thereby, the angle of reflection to the horizontal by the reflected beam; the impinging beam may impinge on the smectite at, with respect to the horizontal, one-half the angle of reflection; and the peak may refer to a peak in intensity of the reflected beam.

The other of the embodiments relates to a method of manufacturing a negative electrode material, which method includes the step of the method comprising: firing montmorillonite as a material to obtain a powder. In this method, the obtained powder contains a silicate of a smectite and, when the smectite is measured with a powder x-ray diffractometer, a peak is found in a case where 2θ is in a range from 7.45° to 9.18°. This arrangement enables a negative electrode material having a high capacity to be obtained using a material other than carbon materials which is abundantly available on Earth.

This manufacturing method may further include the step of adding a lithium salt to the montmorillonite.

In this manufacturing method, the lithium salt may be added to the montmorillonite in an amount of from 0.001 to 5 moles per mole of the montmorillonite.

In this manufacturing method, the firing of montmorillonite may be carried out at a temperature above 300° C.

In this manufacturing method, the lithium salt may be lithium carbonate, lithium nitrate, lithium phosphate, lithium sulfate, lithium sulfite, lithium borate, lithium metaborate, lithium tetraborate, lithium metaphosphate, lithium iodate, lithium acetate, lithium benzoate, lithium lactate, lithium oxalate, lithium tetraphenylborate, lithium stearate, lithium chloride, lithium fluoride, lithium perchlorate, lithium hexafluorophosphate, lithium tetrafluoroborate, lithium orthosilicate or lithium metasilicate.

In this manufacturing method, 2θ may refer to, when a beam of x-rays is caused to impinge on the smectite so as to be reflected thereby, the angle of reflection to the horizontal by the reflected beam; the impinging beam may impinge on the smectite at, with respect to the horizontal, one-half the angle of reflection; and the peak may refer to a peak in intensity of the reflected beam.

This invention enables high-capacity lithium secondary batteries to be obtained with a negative electrode material that uses a material other than carbon materials which is abundantly available on Earth and has a high capacity.

While some embodiments of the invention have been illustrated above, it is to be understood that the invention is not limited to the details of the illustrated embodiments, but may be embodied with various changes, modifications or improvements such as may occur to those skilled in the art without departing from the scope of the invention.

What is claimed is:

1. A method of manufacturing a negative electrode material, the method comprising:
 firing montmorillonite as a material to which a lithium salt has been added at a temperature of from 500° C. to 800° C. to obtain a powder; and
 using a smectite group silicate and a heat treatment product of a lithium salt, wherein the smectite group silicate has a peak at 2θ which is obtained through measurement with a powder x-ray diffractometer on the obtained powder and which is in a range from 7.95° to 9.18°.

2. The method according to claim 1, wherein the lithium salt is added to the montmorillonite as the material in an amount of from 0.001 to 5 moles per mole of the montmorillonite.

3. The method according to claim 1, wherein the lithium salt is selected from the group consisting of lithium carbonate, lithium nitrate, lithium phosphate, lithium sulfate, lithium sulfite, lithium borate, lithium metaborate, lithium tetraborate, lithium metaphosphate, lithium iodate, lithium acetate, lithium benzoate, lithium lactate, lithium oxalate, lithium tetraphenylborate, lithium stearate, lithium chloride, lithium fluoride, lithium perchlorate, lithium hexafluorophosphate, lithium tetrafluoroborate, lithium orthosilicate and lithium metasilicate.

* * * * *